(12) United States Patent
Menduni et al.

(10) Patent No.: US 7,782,589 B2
(45) Date of Patent: Aug. 24, 2010

(54) LENS HOLDING FRAME

(75) Inventors: Gilbert Menduni, Charenton le Pont (FR); Francois Mellon, Charenton le Pont (FR); Eric Roland, Charenton le Pont (FR); Frederic Mathieu, Charenton le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 0 days.

(21) Appl. No.: 12/441,646

(22) PCT Filed: Sep. 18, 2007

(86) PCT No.: PCT/EP2007/059848

§ 371 (c)(1),
(2), (4) Date: Aug. 14, 2009

(87) PCT Pub. No.: WO2008/034824

PCT Pub. Date: Mar. 27, 2008

(65) Prior Publication Data

US 2009/0310081 A1 Dec. 17, 2009

(51) Int. Cl.
*G02C 1/00* (2006.01)
*G02B 27/14* (2006.01)

(52) U.S. Cl. ...................... 361/158; 359/630
(58) Field of Classification Search .............. 351/158, 351/41, 47, 48, 57, 58; 359/630, 631, 632; 345/7, 8, 9

See application file for complete search history.

(56) References Cited

U.S. PATENT DOCUMENTS

| 5,276,471 | A | 1/1994 | Yamauchi et al. |
| 5,929,963 | A | 7/1999 | McNeal |
| 6,290,354 | B1 | 9/2001 | Safran |
| 6,369,952 | B1 * | 4/2002 | Rallison et al. ............. 359/630 |
| 6,945,648 | B2 * | 9/2005 | Schindler et al. ............ 351/158 |

FOREIGN PATENT DOCUMENTS

| DE | 10311972 | 9/2004 |
| WO | WO2005/043220 | 5/2005 |
| WO | WO2006/058188 | 6/2006 |

* cited by examiner

*Primary Examiner*—Hung X Dang
(74) *Attorney, Agent, or Firm*—Occhiuti Rohlicek & Tsao LLP

(57) ABSTRACT

A lens holding frame for holding lenses, both in front of the projection optics of an HMD device and in front of the eye portion of a wearer of the HMD device, the lens holding frame including a nose bridge, the HMD device including a nose pad arranged to support the nose bridge, and at least one correction lens. The lens holding frame is arranged to be stretched out of its original shape under a manual pressure to at least one transitional shape, and includes connecting elements arranged to connect in a reversible manner the HMD device to the lens holding frame being in a transitional shape and having its nose bridge supported by the nose pad of the HMD device.

17 Claims, 2 Drawing Sheets

LENS HOLDING FRAME

CROSS-REFERENCE TO RELATED APPLICATIONS

This application is the National Stage of International Application No. PCT/EP2007/059848, filed on Sep. 18, 2007, which claims the priority of U.S. application Ser. No. 11/523,709, filed on Sep. 20, 2006, now abandoned. The contents of both applications are hereby incorporated by reference in their entirety.

FIELD OF THE INVENTION

This invention relates to an HMD device (1) (Head Mounted Display device). More precisely, this invention relates to a HMD device to which a lens holding frame, having at least one correction lens, is reversibly connected. The invention also relates to the lens holding frame having at least one correction lens.

PRIOR ART

U.S. Pat. No. 6,945,648 relates to an HMD device susceptible to be used in combination with correction lenses, the HMD device comprising two connecting devices, which are magnets, i.e a permanent T-shaped magnet located on the frame, which may be connected with a corresponding U-shaped permanent magnet located on the glasses. This is aimed to obtain a stable connection, though easily releasable.

US2006/0203187 relates to a prescription lens insert to be attached to the shield of an eyewear article, including a means for connecting the central bridge portion of the insert to a corresponding central nose area of the shield, and a set of upper and lower arms extending outward of the bridge portion and being bendable for adjusting the position and orientation of the lenses relative to the shield.

SUMMARY OF THE INVENTION

However, it is major concern that the correction lenses be fixed with an exact, precise and reproducible position with regard to the projection optics of the HMD device; ensuring the reproducibility of the positioning of the lenses remains an issue. Moreover, the use of magnetic devices may not be wanted. Thus, it is a goal of this invention to provide a lens holding frame which car be reversibly connected, through mechanical means, onto an HMD device. By reversibly is meant that the lens holding frame may be put on and taken off as many times as wished, and may each time be positioned with a repeatable accuracy and adjustability with regard to the HMD projection optics.

This invention thus relates to a Lens holding frame for holding lenses, both in front of the projection optics of an HMD device and in front of the eye portion of a wearer of the HMD device, the lens holding frame comprising a nose bridge, the HMD device comprising a nose pad arranged to support the nose bridge, and at least one lens being a correction lens, wherein the lens holding frame is arranged to be stretched out of its original shape under a manual pressure to at least one transitional shape, and wherein the lens holding frame further comprises connecting means arranged to connect in a reversible manner the HMD device to the lens holding frame being in a transitional shape and having its nose bridge supported by the nose pad of the HMD device.

According to an embodiment, the lens holding frame is made of resilient material, the frame holding two lenses, one of which at least being a correction lens.

According to another embodiment, the lens holding frame is made of resilient material having a tensile strength of 400 to 700 N/mm$^2$.

Preferably, the resilient material includes stainless steel.

According to an embodiment, the lens holding frame is arranged to be stretched out of its original shape under manual pressures simultaneously exerted on the opposite ends of the frame.

Advantageously, the connecting means include a central connecting means and two lateral connecting means located at the opposite ends of the frame.

According to a specific embodiment, the HMD device includes a housing and a nose pad, and the connecting means include one central connecting means of the nose bridge of the lens holding frame onto the nose pad of the HMD device, and two lateral connecting means of the opposite ends of the lens frame beneath the HMD housing.

In a variation of the invention, the central connecting means is a hump in the nose bridge designed to lay down on the nose pad of the HMD device.

Preferably, the lateral connecting means are two lateral rods in the form of an S welded on each opposite end of the lens frame, and extending downwardly.

The invention also relates to a HMD device to which a lens holding frame, as hereabove described, is reversibly connected so that the lens holding frame is both in front of the projection optics of the HMD device and in front of the eye portion of a wearer of the HMD device, wherein at least one lens is a correction lens, and wherein the lens holding frame is connected under pressure on the HMD device in a transitional shape different from its original shape.

The lens holding frame is made of resilient material, preferably having a tensile strength of 400 to 700 N/mm$^2$ and the frame holds two lenses, one of which at least being a correction lens. Advantageously, the resilient material includes stainless steel.

According to an embodiment, the HMD device includes a housing and a nose pad, and the connecting means include one central connecting means of the nose bridge of the lens frame onto the nose pad of the HMD device, and two lateral connecting means of the opposite ends of the lens frame beneath the HMD housing. According to another embodiment, the HMD device includes a housing and a nose pad, and the connecting means include one central connecting means of the nose bridge of the lens frame onto the nose pad of the HMD device, which is a hump on the nose bridge of the lens frame, designed to fit in a groove carved in the nose pad of the HMD device, and two lateral connecting means of the opposite ends of the lens frame beneath the HMD housing.

This invention also relates to a method for connecting a lens holding frame onto a HMD device, both in front of the projection optics of an HMD device and in front of the eve portion of a wearer of the HMD device, wherein at least one lens is a correction lens, and wherein the frame includes or is made of resilient material and includes connecting means onto the HMD device, the method comprising:
- simultaneously pressing the opposite ends of the lens holding frame to put the lens holding frame in a transitional shape
- placing the connecting means of the lens holding frame in a position suitable for its connection with the HMD device
- releasing the pressure onto the opposite ends of the lens holding frame, so that the connecting means connect with the HMD device.

According to the embodiment, the method of the invention comprises a preliminary step of connecting the nose pad to the HMD device. According to another embodiment, placing the connecting means includes first having the nose bridge laid down onto the nose pad, and second engaging the lateral connecting means under the housing of the HMD device.

Although the following detailed description contains specific features, these should not be construed as limiting the scope of the invention but as merely providing illustrations of some of the presently preferred embodiments of the invention.

Figure 1:
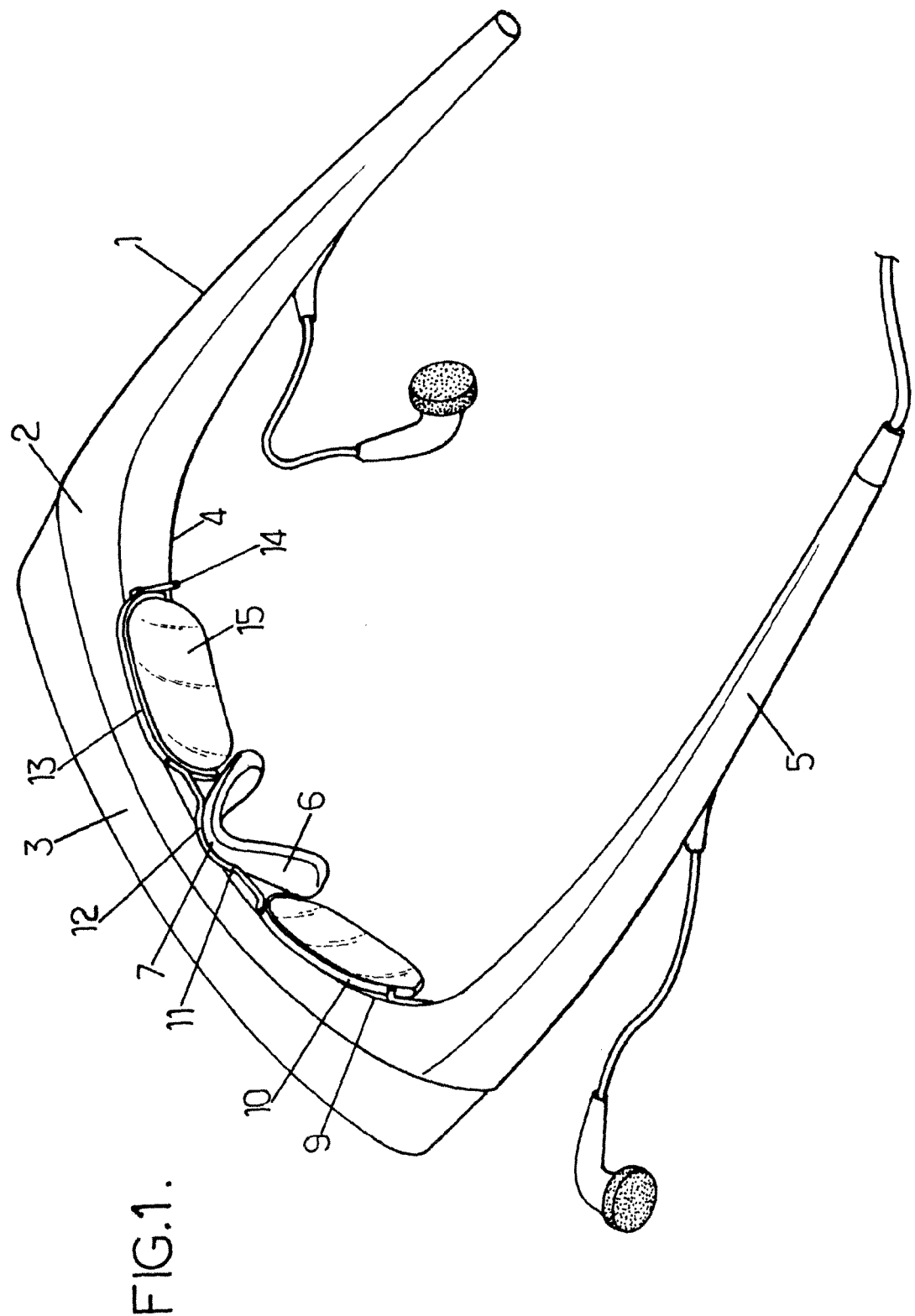
FIG. 1 is a perspective view of the HMD device of the invention, on which the lens holding frame 10 is adapted

This invention thus relates to lenses mounted on a frame, hereinafter called the "lens holding frame", the lens holding frame being releasably mountable on a HMD device, and to an HMD device suitable for having a lens holding frame releasably mounted on it. Releasably mountable in the meaning of this invention means that the lens holding frame is made attachable and detachable from the HMD device. According to the invention, the connection or disconnection of the lens holding frame to the HMD device can be done by the user manually, without tools, and without effort, by simply disengaging the connecting means, preferably by pressing the opposite parts of the lens holding frame to disengage the lateral connecting means from beneath the housing of the HMD device.

According to a preferred embodiment, at least one lens held by the lens holding frame is a correction lens. By correction lenses is meant lenses or glasses which aim at correcting an eye deficiency of the user.

According to a preferred embodiment, the lens holding frame is made of any suitable resilient material, which means material of any nature, as long as it is resilient. By resilient in this invention, is meant that the frame has elastic properties, so that the opposite ends of the frame may be simultaneously tensed down, but tend to recover their initial position. According to an embodiment, the resilient material constituting the lens holding frame is made of, or includes in its composition, stainless steel. According so a preferred embodiment, the lens holding frame is a resilient stainless steel wire comprising 8-10.5% Nickel 17-19% Chromium, 3-4% of Copper, less than 0.08% Carbon, less than 2% Manganese, less than 1% Silicon, and less than 0.045% Phosphorus. According to an embodiment, the lens holding frame according to the invention is arranged to be stretched out of its original shape under manual pressures simultaneously exerted on the opposite ends of the frame.

According to an embodiment, the lens holding frame s made of resilient material having a tensile strength of 400 to 700 N/mm$^2$, more preferably of 500 to 600 N/mm$^2$. According to an embodiment of the invention, the elongation capacity of the lens holding frame is of 30 to 50%, preferably of 35 to 45%.

The length of the lens holding frame is adapted to the housing of the HMD device. According to an embodiment, the total length of the lens holding frame is of 110 to 150 mm.

The width of the lens holding frame is adapted to the housing of the HMD device. According to an embodiment, the total width of the lens holding frame as of 15 to 25 mm.

The thickness of the lens holding frame is adapted to the housing and to the nose pad of the HMD device. According to an embodiment, the thickness is of 0.5 to 5 mm.

According to this invention, the lens holding frame comprises two lenses, one at least being a correction lens. The lenses may be made of glass, plastics or any other suitable material. The lenses are preferably fixed permanently to the lens holding frame.

According to the invention, the connecting means, which are the means for connecting the lens holding frame to the HMD device, include a central connecting means and two lateral connecting means located at the opposite ends of the frame.

In this invention, the term connecting is meant as putting into contact an HMD device on one hand, and a lens holding frame put in a tensed or stretched position, by applying a mechanical pressure in the opposite ends of the frame, on the other hand in order to mechanically attach or connect the lens holding frame onto the HMD device, in such a way that the lens holding frame securely remains on the HMD device during use, and is attachable and detachable.

According to an embodiment, the central connecting means is the nose bridge or the central part of the nose bridge or is within the nose bridge. According to an embodiment, the central portion of the nose bridge is slightly curved to form a hump, for a better fitting of the nose bridge on the HMD device. Preferably, the central connecting means is a hump in the nose bridge designed to lay down on the nose pad of the HMD device. According to an embodiment, the lateral connecting means are two lateral rods in the form of an S, one rod being welded on each opposite lateral end of the lens frame, and extending downwardly, so that, when the user simultaneously urges vertically and then horizontally the opposite sides of the lens holding frame, each part of the S rods engage beneath the HMD device, and is retained there when the urge ceases by the spring effect of the resilient material.

According to an embodiment, the HMD device includes a housing and a nose pad, and the connecting means include one central connecting means of the nose bridge of the lens frame onto the nose pad of the HMD device, and two lateral connecting means of the opposite ends of the lens frame beneath the HMD housing.

The lens holding frame may be moulded in a unitary piece. According to an embodiment, the lens holding frame is rimless. According to another embodiment, the lens holding frame includes half rims welded on each side the nose bridge. According to still another embodiment, the lens holding frame includes one full rim including the nose bridge and two parts extending from each side of the nose bridge, parts to which the lenses are attached.

In an embodiment, the lens holding frame lack temples.

The connecting means are such that the lens holding frame may be adjusted onto the HMD device in a secure, reproducible and releasable position. According to an embodiment, when connected onto the HMD device, the lens holding frame may always held in the same predetermined position with regard to the HMD device, which helps preventing undesirable movement of the lens holding frame relative to the HMD device. According to this invention, the connecting means are capable of continuously supporting the lenses held by the lens holding frame in front of the HMD device projection optics, in a proper mounting position and in proper lens alignment of both HMD projection optics and lenses. An advantage of this invention is that the lens holding frame may be mounted or replaced quickly on the HMD device. This invention may thus provide a secure retention and a stable connection of the lens holding frame on the HMD device, during use of the HMD device.

The connecting means include surfaces of retention of the lens holding frame onto the HMD device, and use the resiliency of the resilient lens holding frame material. The retention surfaces are the surfaces where the lens holding frame is retained onto the HMD device by friction and by the strength exerted by the resiliency of the lens holding frame material. These surfaces are located respectively at the opposite ends of the lens holding frame and in the central part of the nose bridge of lens holding frame. Any suitable means may be adapted to the location of the retention surfaces in order to enhance friction.

Thanks to its resilient material, the lens holding frame is elastically flexible in a vertical plane and in a horizontal plane. In the connected position, the lens holding frame behave like a spring between central connecting point(s) and lateral connecting point(s).

The invention also relates to an HMD device comprises housing, temples, a nose pad and projection optics. The nose pad of the HMD device of the invention may be a separate part or alternatively, moulded with the housing of the HMD device.

In the embodiment where the nose pad is a separate part, it is attachable and removable from the HMD device; in this embodiment the nose pad is advantageously clipped on the HMD device. The lower surface of nose pad may have various shapes, adapted to the morphology of the user. Thus, the user may choose a nose pad suitable for the morphology of his/her nose. According to a preferred embodiment, the area of the nose pad which is engaged, preferably clipped, on the HMD device, is always the same, whatever the shape of the part of the nose pad laying down on the nose of the user is. According to another preferred embodiment, the nose pad always includes an upper surface on which the nose bridge of the lens holding frame may be laid down or engaged.

The HMD device of the invention is suitable for connection with a lens holding frame for holding lenses, both in front of the projection optics of an HMD device and in front of the eye portion of a wearer of the HMD device, the lens holding frame comprising a nose bridge, the HMD device comprising a nose pad arranged to support the nose bridge, and at least one lens being a correction lens, wherein the lens holding frame is arranged to be stretched out of its original shape under a manual pressure to at least one transitional shape, and wherein the lens holding frame further comprises connecting means arranged to connect in a reversible manner the HMD device to the lens holding frame being in a transitional shape and having its nose bridge supported by the nose pad of the HMD device.

According to an embodiment, the nose pad projecting towards the face of the user of the HMD device has, on the upper surface of its projected portion, a groove parallel to the housing of the HMD device.

According to an embodiment of the invention, the HMD device according to the invention may be provided such that the observer wearing it on his head can only perceive the images (in particular, virtual images) generated by the HMD device. Alternatively, it may also be provided such that he will perceive the generated images as superimposed upon the environment or that he will perceive the generated images in one part of his visual range and the environment in another.

Further, the HMD device may be provided such that it either generates images for only one or for both of the observer's eyes, it being possible, in the latter case, to achieve a three-dimensional representation, in particular, by a slight difference between the images for the right eye and for the left eye. According to an embodiment, the HMD device of the invention is suitable for an anaglyphic perception of the images. According to a first embodiment, the lens holding frame is such that one lens is of red colour and the other lens is of blue-green color. According to a second embodiment, the HMD projection optics include one lens is of red colour and the other lens is of blue-green color. According to a third embodiment, the HMD device includes a image treatment suitable for an anaglyphic perception of the images by the user.

FIG. 1 shows an HMD device 1 to which a lens holding frame 10 is adapted, the HMD device 1 comprising a housing 2, temples 5, a nose pad 6 and projection optics 9. The nose pad 6 projects toward the face of the user of the HMD device 1. According to the embodiment shown in FIG. 1, the top 7 of the nose pad 6 has a groove 8 parallel to the housing of the HMD device 1.

When the user puts on the HMD device of FIG. 1, or wears it on his head, the temples 5 are supported by the ears and the nose pad is supported by the nose, so that the HMD device is worn like ordinary glasses.

Figure 2:
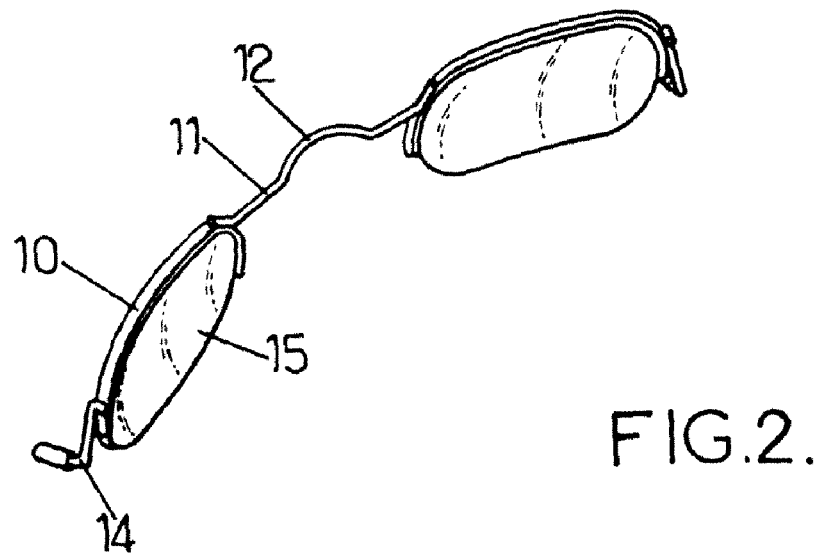
FIG. 2 is a front view of the lens holding frame 10.

FIG. 2 shows the lens holding frame 10.

According to an embodiment, the lens holding frame has a general rectangular form, with a total length of 110 to 120 mm, and the total width of 30 to 40 mm. Preferably, each lens is of general rectangular form with a height of 17 to 18 mm and a width of 33.5 mm. The thickness of the frame may be adapted to the thickness of the lenses. According to an embodiment, the thickness of the frame is of 1 to 5 mm, preferably 1.75 mm. The lens holding frame may be curved. Preferably, the neutral radius of the curve is of about 90 to 110°. According to an embodiment, the neutral radius is of 104.6.

According to a particular embodiment, the lens holding frame comprises a nose bridge 11 with a central hump 12, two lenses, at least one being a correction lens. Preferably, the length of the nose bridge is of 25 to 40 mm, preferably 30-38 mm.

Each lens may be mounted on a rim, welded on one side to the nose bridge, and on the other side to a connecting rod 14. The length of each rim is adapted to the length of the lens.

The connecting rods 14 may extend downwardly, orthogonally with regard to the rims to which they are welded, and are preferably deviated from the verticality of about 10°.

Considering that the nose bridge 11 of the lens holding frame 10 is laid onto the nose pad 6 of the HMD device 1, the lens holding frame 10 may then be urged down by the user, using the resiliency of the material constituting the lens holding frame 10, towards the bottom 4 of the housing 2 of the HMD device 1.

The connection of the lens holding frame 10 to the HMD device 1 may be effected by engaging the nose bridge 11 of the lens holding frame 10 in the groove 8 located on the top 7 of the nose pad 6 and by flexing downwardly the opposite ends of the lens holding frame and pushing them for engagement of the lower part of the rods 14 beneath the HMD device (1).

The rods 14 are preferably in the form of an S, the upper part of the S being welded to the rim 13, the central part of the S extending downwardly vertically, and the end of the S being essentially orthogonal of the central part of the S and extending toward the bottom 4 of the housing 1. The rods 14 may for an angle of about 5 to 30° to the vertical plan of the lens holding frame. The length of the rods shall be adapted to the housing. In an embodiment, the length of the rods is of 14 to 15 mm.

Figure 3:
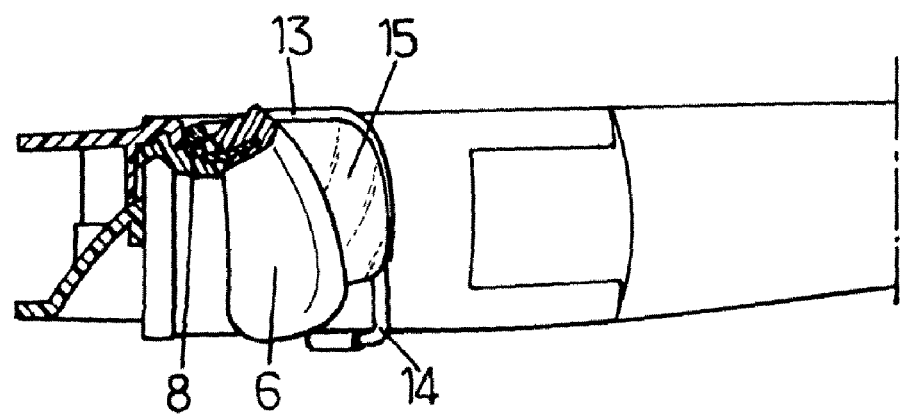
FIG. 3 is a sectional view of the central portion of the HMD, and includes a sectional view of the nose pad 6 and of the groove 8 carved in the nose pad 6.

FIG. 3 shows an example of a nose pad, having a lens holding frame on it.

The invention claimed is:

1. A lens holding frame for holding lenses, both in front of the projection optics of an HMD device having a nose pad and in front of the eye portion of a wearer of the HMD device, the lens holding frame comprising a nose bridge, at least one lens being a correction lens, wherein the lens holding frame is arranged to be stretched out of its original shape under a manual pressure to at least one transitional shape, and wherein the lens holding frame further comprises connecting means arranged to connect in a reversible manner the HMD device to the lens holding frame being in a transitional shape, so that the nose bridge supported by the nose pad of the HMD device, said connecting means including a central connecting means and two lateral connecting means located at the opposite ends of the frame and arranged to be engaged beneath the housing of the HMD device.

2. The lens holding frame according to claim 1, wherein the lens holding frame is made of resilient material, the frame holding two lenses, one of which at least being a correction lens.

3. The lens holding frame according to claim 1, wherein the lens holding frame is made of resilient material having a tensile strength of 400 to 700 N/mm$^2$.

4. The lens holding frame according to claim 1, wherein the lens holding frame is made of resilient material, the resilient material including stainless steel.

5. The lens holding frame according to claim 1, wherein the frame is arranged to be stretched out of its original shape under manual pressures simultaneously exerted on the opposite ends of the frame.

6. The lens holding frame according to claim 1, wherein the HMD device includes a housing and a nose pad, and the connecting means include one central connecting means of the nose bridge of the lens frame onto the nose pad of the HMD device, and two lateral connecting means of the opposite ends of the lens frame beneath the HMD housing.

7. The lens holding frame according to claim 6, wherein the lateral connecting means are two lateral rods in the form of an S welded on each opposite end of the lens holding frame, and extending downwardly.

8. The lens holding frame according to claim 1, wherein the central connecting means is a hump in the nose bridge designed to lay down on the nose pad of the HMD device.

9. A HMD device comprising a housing, projection optics, and a nose pad, to which a lens holding frame, comprising a central connecting means and lateral connecting means, is reversibly connected, with the central connecting means being supported by the nose pad of the HMD device and the lateral connecting means being engaged beneath the housing of the HMD device, so that the lens holding frame is both in front of the projection optics of the HMD device and in front of the eye portion of a wearer of the HMD device, wherein at least one lens is a correction lens, and wherein the lens holding frame is connected under pressure to the HMD device in a transitional shape different from its original shape.

10. The HMD device according to claim 9, wherein the lens holding frame is made of resilient material, the frame holding two lenses, one of which at least being a correction lens.

11. The HMD device according to claim 9, wherein the lens holding frame is made of resilient material having a tensile strength of 400 to 700 N/mm$^2$.

12. The HMD device according to claim 9, wherein the lens holding frame is made of resilient material, the resilient material being stainless steel.

13. The HMD device according to claim 9, wherein the nose pad is removable from the HMD device.

14. The HMD device according to claim 9, wherein the HMD device includes a housing and a nose pad, and the connecting means include one central connecting means of the nose bridge of the lens frame onto the nose pad of the HMD device, and two lateral connecting means of the opposite ends of the lens frame beneath the HMD housing.

15. The HMD device according to claim 9, wherein the HMD device includes a housing and a nose pad, and the connecting means include one central connecting means of the nose bridge of the lens frame onto the nose pad of the HMD device, which is a hump on the nose bridge of the lens frame, designed to fit in a groove carved in the nose pad of the HMD device, and two lateral connecting means of the opposite ends of the lens frame beneath the HMD housing.

16. Method to connect a lens holding frame onto a HMD device, both in front of the projection optics of an HMD device and in front of the eye portion of a wearer of the HMD device, wherein at least one lens is a correction lens, and wherein the frame is made of resilient material and includes connecting means onto the HMD device, the method comprising:

simultaneously pressing the opposite ends of the lens holding frame to put the lens holding frame in a transitional shape placing the connecting means of the lens holding frame in a position suitable for its connection with the HMD device releasing the pressure onto the opposite ends of the lens holding frame, so that the connecting means connect with the HMD device.

17. Method according to claim 16, comprising a preliminary step of connecting the nose pad to the HMD device.

* * * * *